Feb. 17, 1970 J. L. KELLY 3,495,839

TURNTABLE RECESS FOR RECORD REMOVAL

Filed Jan. 8, 1968

INVENTOR:
JACK L. KELLY,

BY Thomas A. Briody
HIS ATTORNEY.

United States Patent Office 3,495,839

Patented Feb. 17, 1970

3,495,839

TURNTABLE RECESS FOR RECORD REMOVAL

Jack L. Kelly, Decatur, Ill., assignor to General Electric Company, a corporation of New York Filed Jan. 8, 1968, Ser. No. 696,299
Int. Cl. G11b *3/60*
U.S. Cl. 274—39 1 Claim

ABSTRACT OF THE DISCLOSURE

In a phonograph turntable having a rectangular recess therein for snugly accommodating relatively thin disc type records, a plurality of corner interruptions formed in the turntable recess to facilitate convenient removal of such a record from the turntable, each interruption including a vertically recessed portion which underlies a peripheral segment of a record placed in the turntable recess, thereby to provide ready access for removing the records from the turntable.

This invention relates to a turntable arrangement for a phonograph, and more particularly to a simplified turntable structure which includes an effective and improved means for removing records from the turntable.

One type of record which is now being used in small recorder-reproducer mechanisms is a thin vinyl type of record. Such a record is sometimes not only thin in depth, but also small in size to facilitate its convenient mailability. When such a record is placed in a turntable recess, due to the thickness, flexibility and peripheral smallness in size of the record, it is often difficult to conveniently remove the thin record from the turntable after it has been played. It is therefore desirable that an improved turntable mechanism should be provided which readily lends itself to convenient operability with thin records and enhances the removability of the records therefrom.

Accordingly, it is an important object of the present invention to provide an improved phonograph turntable arrangement which includes a novel means for readily removing relatively thin records from the turntable.

It is another object of my invention to provide an improved turntable which is both simplified and inexpensive, and also includes an integral structural means that helps to facilitate the convenient removal of records therefrom.

Still another object of my invention is to provide an improved turntable structure of the type which includes a recess for receiving a record, and which enables a person to readily remove the recessed record from the turntable by placement of a finger underneath the outer rim of the record adjacent its periphery.

In carrying out the present invention, in one form thereof, there is provided a phonograph turntable having a rectangularly configured recess formed in its upwardly facing surface. This recess includes four rectangularly arranged but disconnected vertical walls. The vertical walls of the turntable recess are dimensioned and disposed so that they may be in contiguity with respective side edges of a relatively thin disc type record of generally rectangular configuration, when the record is positioned in the recess of the turntable. Each of the four vertical walls of the turntable recess is separated at each end thereof from an adjacent end of a normally disposed other vertical wall by means of a turntable interruption. Each aforesaid turntable interruption includes a portion thereof which is recessed to underlie a peripheral segment of a record placed in the turntable recess. Such a turntable arrangement thus provides four turntable interruptions disposed at the corners of the rectangular recess of the turntable for removal of the rectangular records. This approach makes it very easy for a person to remove a thin rectangular record from the turntable.

By further aspects of the present invention, additional desirable features may be included in the phonograph turntable arrangement, and the specification concludes with claims particularly pointing out and distinctly claiming the subject matter which I regard as my invention. The invention, however, as to organization and method of operation, together with further objects and advantages thereof, may best be understood by reference to the following description, when taken in conjunction with the accompanying drawings, in which:

Figures 1, 2, 3:
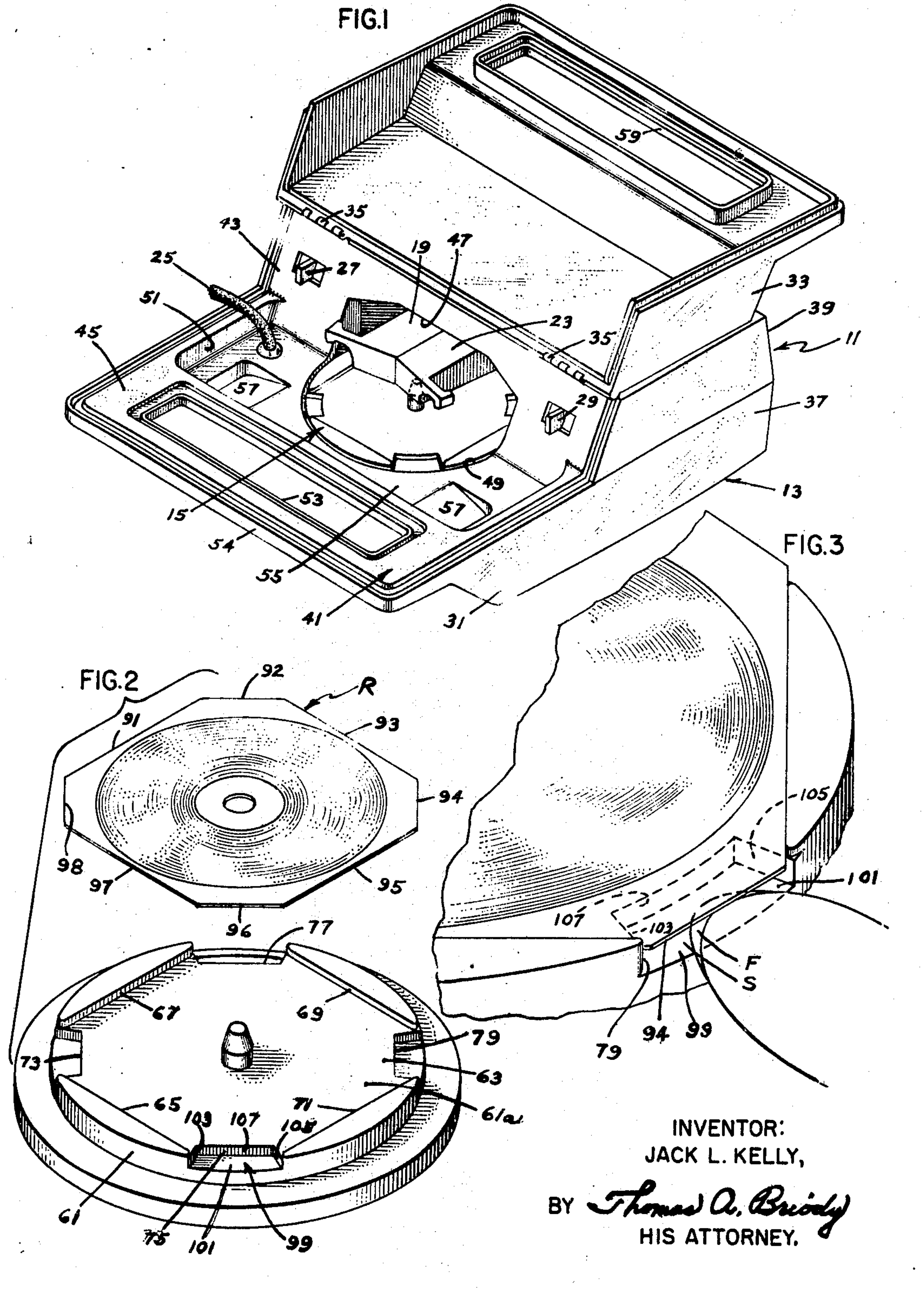
FIG.1 is a perspective view of a disc type recording and reproducing device embodying the present invention, in one form thereof.
FIG. 2 is a frontal perspective and exploded view of the turntable of the device of FIG. 1, and a record therefor.
FIG. 3 is a fragmentary enlarged view of a portion of the turntable for the device of FIG. 1, showing the mode of removal of a record from the turntable by the finger of an operator.

Referring in detail to the drawing, and in particular to FIG. 1 thereof, there is shown a disc-type recording and reproducing device 11 embodying one form of my invention. The recording device 11 essentially comprises a housing 13 wherein the turntable 15 and its driving motor (not shown) are located, recording arm 19, playback arm 23, and an amplifier (not shown). It will be understood by those skilled in the art, that the recording device 11 also includes a speaker and a microphone which may be combined into a combination speaker-microphone type of headset connected to cord 25; however, for purposes of simplicity, these structures have not been shown in the drawing illustration. For controlling the device 11, there is also provided an "on-off" and volume control knob 27 and a "pause" control knob 29. Knob 29 is thus for selectively coupling and uncoupling the driving motor to the turntable 15 for facilitating desired momentary interruption of its movement.

Turning now to a further discussion of the structure of housing 13 of device 11, it will be noted that, as shown in FIG. 1, the housing 13 has a generally L-shaped bottom portion 31 and a pivoted lid portion 33 which is connected to the bottom portion 31 by a pair of hinges 35.

The bottom portion 31 of housing 13 includes a pair of opposed generally L-shaped side walls 37 which extend vertically and are connected at their rear to a generally vertical rear wall 39. At the front of bottom housing portion 31 there is formed a shallow L-shaped deck 41. Deck 41 includes an inclined section 43 which is disposed at a small angle from normal relationship with respect to horizontal section 45. Thus, as shown in FIG. 1, the sloped deck section 43 of deck 41 extends upwardly and rearwardly from the back of horizontal section 45.

The deck 41 of bottom portion 31 of the device housing includes a slot 47 formed in sloped section 43 thereof to provide clearance for movement of the arms 19, 23 and access to the turntable 15. A portion of turntable 15 extends outwardly from slot 47 to allow ready access to the turntable for the placement and removal of records with respect thereto.

In deck 41 of the bottom housing portion 31 there is also formed a semicircular cutout section 49, a recessed tray-like area 51 within which the cutout section 49 is located, and an elongated rectangular handle slot 53. The semicircular cutout section 49 is provided to fit around and accommodate approximately one-half of the turntable 15, which is arranged therein in slightly raised relationship from being flush with the bottom surface 55 of the tray-like area 51. The tray-like area 51 includes a pair of spaced apart inclined recesses 57 for receiving a handset (not shown) when the device 11 is being stored. Elongated handle slot 53 is disposed in a lip-like upper extension 54 of bottom portion 31, and it cooperates with a similarly configured mating handle slot 59 of the lid portion 33 to assume an aligned engagement therewith when lid portion 33 is closed into engagement with bottom housing portion 31 (not shown). Slots 53 and 59, thus enable the device 11 to be readily carried by the hand of an operator when the housing members 31, 33 are in closed position.

Turning now to an important aspect of the present invention which concerns itself with the construction and arrangement of turntable 15, attention is directed to FIGS. 2 and 3. As shown therein the upwardly facing platform 61 forms part of a generally square shaped recess 63. It should be noted that recess 63 is not necessarily square shaped in configuration, since it does not include any corners as does the usual rectangle. Thus, as best shown in FIG. 2, recess 63 includes four vertical walls 65, 67, 69 and 71, which are of equal length and arranged in rectangular fashion, but these walls are not connected together. Wall 65, which forms a vertical segment of the upper disc shaped platform 61, merges at one of its ends into a curved interruption 73, and at the other of its ends into a curved interruption 75. Wall 67 forms a vertical segment of the upper disc-shaped platform 61 and merges at one of its ends (adjacent wall 65) into the interruption 73 and at the other of its ends (adjacent wall 69) into the interruption 77. Wall 69 forms a vertical segment of the upper disc-shaped platform 61 and merges at one of its ends (adjacent wall 67) into interruption 77 and at the other of its ends (adjacent wall 71) into interruption 79. Wall 71 forms a vertical segment of the upper disc-shaped platform 61 and merges at one of its ends (adjacent wall 69) into interruption 79 and at the other of its ends (adjacent wall 65) into interruption 75.

Record R is designed for peripheral cooperation with the recess 63 of turntable 15, and for this purpose it includes four equidistant sides 91, 93, 95 and 97 which are connected together by diagonally "squared" corners 92, 94, 96 and 98. Thus, more particularly, side 91 is arranged in perpendicular relationship to side 93 and is connected thereto by angular edge 92. Side 93 is in generally perpendicular relationship with side 95 and is connected thereto by angular edge 94. Side 95 is in perpendicular relationship with side 97 and is connected thereto by angular edge 96. Side 97 is in generally perpendicular relationship with side 91 and is connected thereto by angular edge 98.

It will thus be seen that the configuration of the record R is generally hexagonal, since it includes eight (8) sides. The side edges 91, 93, 95 and 97 of record R are each slightly longer than the associated vertical walls 67, 69, 71 and 65 of the turntable recess 63. Record R is thus dimensioned so that upon its insertion into recess 63, its edges 91, 93, 95 and 97 are in contiguity with, but each slightly longer than, associated vertical walls 67, 69, 71, and 65 of the turntable recess. As best shown in FIG. 3, a corner "squared" portion, such as edge 94 is disposed within a turntable interruption, such as interruption 79.

To help enhance the removability of records R, in accordance with the present invention, each of the turntable interruptions 73, 75, 77 and 79 is specially constructed so that it includes a step 99. Step 99 is thus formed to include a substantial undercut horizontal surface 101 which is recessed downwardly from the main horizontal supporting surface 61*a* of the recess 63. The stepped surface 101 is connected to upper surface 61*a* of the turntable by a pair of radially directed vertical sides 103, 105, that are connected to opposite ends of a segment shaped vertical step 107. It will also be understood that vertical step 107 may have an arc shaped or circular type configuration (not shown).

With such a structure of the four interruptions 73, 75, 77 and 79, as shown in FIG. 3 for interruption 79, there is an effective space S available at each interruption underneath the associated squared corner of record R. As a consequence thereof, the user of the device 11 may readily insert his fingernail F into the space S to engage the underside of the squared corner of record R for removal of the record R from turntable 15.

When the four interruptions 73, 75, 77 and 79 of my invention are incorporated in device 11, they have been found to significantly enhance the removability of the records R.

It will now, therefore be seen that the present invention is an improved turntable structure and arrangement which may be used with distinct advantage in a small portable recording and reproducing device that uses small and thin disc type records. It will be further understood that the turntable structure of my invention is economical in cost and simple to manufacture.

While in accordance with the Patent Statutes. I have described what at present is considered to be the preferred embodiment of my invention, it will be obvious to those skilled in the art that various changes and modifications may be made therein without departing from this invention.

What I claim as new and desire to secure by Letters Patent of the United States.

1. A phonograph comprising a support, a turntable mounted for rotative movement upon said support about a vertical axis, a rectangularly configured recess formed in the upwardly facing surface of said turntable for cooperative receipt of a relatively thin disc type record of generally rectangular configuration, said record having four major sides arranged in rectangular fashion, said sides being connected together by four squared corners of substantially less dimension than said sides, said recess including a horizontally disposed main supporting surface for supporting said record positioned in said recess, and four rectangularly arranged vertical walls, said walls of the recess of said turntable being dimensioned and disposed for contiguity with respective side edges of said record when said record is positioned on the turntable, each vertical wall of the recess of said turntable being separated at each of its ends from an adjacent end of a normally disposed other vertical wall of said recess, by a recessed interruption thereby to provide four equally spaced recessed interruptions, each of said interruptions having an associated one of the squared corners of said record positioned therein when said record is positioned in said recess; said equally spaced interruptions each including a pair of radially directed and generally opposed vertical sides, an inner vertical wall having each of its ends connected to one of the inner ends of said sides, said sides and inner wall being each connected to and extending downwardly from the main supporting surface of said turntable, said interruptions each also including a substantially horizontal surface connected to the bottoms of said vertical sides and inner wall and stepped downwardly from the main supporting surface of the turntable, each said horizontal surface opening outwardly from said turntable to form an open corner in the rectangularly configured recess of the turntable for cooperatively receiving one of the four squared corners of the aforesaid record, each of the said squared corners of said record being disposed radially at and within one of said turntable interruptions and spaced above the substantial horizontal surface, whereby the user of the phonograph may readily insert his fingernail for engagement underneath a squared corner of said rectangularly configured record positioned on the turntable thereby to enable the expeditious removal of records from the turntable of said phonograph.

References Cited

UNITED STATES PATENTS

| | | | |
|---|---|---|---|
| 3,386,741 | 6/1968 | Kingsbury | 274—1 |
| 3,227,458 | 6/1966 | Copoulos et al. | 274—9 |

SAMUEL S. MATTHEWS, Primary Examiner